(12) United States Patent
Moore

(10) Patent No.: US 7,857,080 B2
(45) Date of Patent: Dec. 28, 2010

(54) SYSTEM FOR SELECTIVELY CONSUMING AND STORING ELECTRICAL ENERGY IN A HYBRID VEHICLE

(75) Inventor: Jeremy Moore, Ypsilanti, MI (US)

(73) Assignee: Hitachi Automotive Products (USA), Inc., Harrodsburg, KY (US)

( * ) Notice: Subject to any disclaimer, the term of this patent is extended or adjusted under 35 U.S.C. 154(b) by 38 days.

(21) Appl. No.: 12/355,915

(22) Filed: Jan. 19, 2009

(65) Prior Publication Data
US 2010/0140000 A1 Jun. 10, 2010

(51) Int. Cl.
*B60W 20/00* (2006.01)
*B60K 6/42* (2007.10)
(52) U.S. Cl. .................. 180/65.22; 180/65.265
(58) Field of Classification Search .......... 180/65.21, 180/65.22, 65.245, 65.25, 65.26, 65.265, 180/65.275, 65.28, 65.285, 65.6, 65.7; 903/918, 903/930, 940, 941, 942, 945
See application file for complete search history.

(56) References Cited

U.S. PATENT DOCUMENTS

| | | | | |
|---|---|---|---|---|
| 6,007,443 A * | 12/1999 | Onimaru et al. | ................ | 475/5 |
| 6,026,921 A * | 2/2000 | Aoyama et al. | .......... | 180/65.25 |
| 6,054,844 A * | 4/2000 | Frank | ...................... | 322/16 |
| 6,281,660 B1 * | 8/2001 | Abe | ........................ | 320/103 |
| 6,328,671 B1 * | 12/2001 | Nakajima et al. | ............. | 477/46 |
| 6,751,960 B2 * | 6/2004 | Arimitsu et al. | ............... | 60/706 |
| 6,809,429 B1 * | 10/2004 | Frank | ..................... | 290/40 C |
| 7,011,600 B2 | 3/2006 | Miller et al. | | |
| 7,036,620 B2 | 5/2006 | Miller et al. | | |
| 7,125,297 B2 | 10/2006 | Miller et al. | | |
| 7,150,770 B2 | 12/2006 | Keipert et al. | | |
| 7,160,222 B2 | 1/2007 | Miller | | |
| 7,166,052 B2 | 1/2007 | Miller et al. | | |
| 7,166,056 B2 | 1/2007 | Miller et al. | | |
| 7,169,076 B2 | 1/2007 | Miller et al. | | |
| 7,174,979 B2 * | 2/2007 | Ohta et al. | ............... | 180/65.25 |
| 7,175,564 B2 | 2/2007 | Miller | | |
| 7,183,485 B2 | 2/2007 | Groothuis et al. | | |
| 7,195,583 B2 | 3/2007 | Leib | | |
| 7,198,582 B2 | 4/2007 | Miller et al. | | |
| 7,198,584 B2 | 4/2007 | Miller et al. | | |
| 7,198,585 B2 | 4/2007 | Miller et al. | | |
| 7,201,693 B2 | 4/2007 | Miller et al. | | |
| 7,201,694 B2 | 4/2007 | Miller et al. | | |
| 7,201,695 B2 | 4/2007 | Miller et al. | | |
| 7,204,777 B2 | 4/2007 | Miller et al. | | |
| 7,214,159 B2 | 5/2007 | Miller et al. | | |
| 7,217,215 B2 | 5/2007 | Miller et al. | | |
| 7,232,395 B2 | 6/2007 | Miller et al. | | |
| 7,235,031 B2 | 6/2007 | Miller et al. | | |
| 7,238,136 B2 | 7/2007 | Miller et al. | | |

(Continued)

*Primary Examiner*—J. Allen Shriver
*Assistant Examiner*—Jacob Meyer
(74) *Attorney, Agent, or Firm*—Gifford, Krass, Sprinkle, Anderson & Citkowski, P.C.

(57) ABSTRACT

A system for selectively consuming and storing electrical energy in a hybrid vehicle. The system includes an electric motor/generator unit having a rotary shaft and an internal combustion engine having a main shaft. A continuously variable transmission mechanically couples the electric motor/generator rotary shaft to the engine main shaft. A control circuit varies the amount of torque of the electric motor/generator unit rotary shaft between a negative and a positive value as a function of the operating condition of the vehicle. The control circuit also controls the transmission to vary the transmission ratio as a function of the engine operating conditions.

2 Claims, 3 Drawing Sheets

U.S. PATENT DOCUMENTS

| | | |
|---|---|---|
| 7,238,137 B2 | 7/2007 | Miller et al. |
| 7,238,138 B2 | 7/2007 | Miller et al. |
| 7,250,018 B2 | 7/2007 | Miller et al. |
| 7,261,672 B2 * | 8/2007 | Frank et al. .................. 477/45 |
| 7,430,469 B2 * | 9/2008 | Kaita ......................... 701/102 |
| 7,617,894 B2 * | 11/2009 | Ozeki et al. ............. 180/65.21 |
| 2001/0042647 A1 * | 11/2001 | Sakamoto et al. .......... 180/65.2 |
| 2003/0173934 A1 * | 9/2003 | Arimitsu ..................... 322/34 |
| 2004/0254047 A1 * | 12/2004 | Frank et al. ................. 477/37 |
| 2005/0077731 A1 * | 4/2005 | Shimizu .................. 290/40 C |
| 2005/0088139 A1 * | 4/2005 | Frank ......................... 320/104 |
| 2006/0180363 A1 * | 8/2006 | Uchisasai et al. .......... 180/65.2 |
| 2007/0204601 A1 * | 9/2007 | Ishii et al. .................... 60/295 |
| 2008/0000746 A1 * | 1/2008 | Schiele et al. ............. 192/3.54 |
| 2008/0032858 A1 * | 2/2008 | Frank et al. .................. 477/37 |
| 2008/0238108 A1 * | 10/2008 | Edelson et al. ............ 290/40 C |
| 2009/0209382 A1 * | 8/2009 | Tabata et al. .................... 475/5 |
| 2010/0004843 A1 * | 1/2010 | Yu et al. ..................... 701/102 |
| 2010/0048347 A1 * | 2/2010 | Yang ............................. 477/5 |
| 2010/0048349 A1 * | 2/2010 | Yang ............................. 477/5 |

* cited by examiner

SYSTEM FOR SELECTIVELY CONSUMING AND STORING ELECTRICAL ENERGY IN A HYBRID VEHICLE

BACKGROUND OF THE INVENTION

I. Field of the Invention

The present invention relates generally to hybrid vehicles and, more particularly, to a system for selectively consuming and storing electrical energy in the hybrid vehicle.

II. Description of Material Art

Hybrid vehicles are enjoying increased popularity and acceptance due in large part to the cost of fuel for internal combustion engine vehicles. Such hybrid vehicles include both an internal combustion engine as well as an electric motor to propel the vehicle.

In the current design for both consuming as well as storing electrical energy, the rotary shaft from a combination electric motor/generator is coupled by a drive belt to the main shaft of an internal combustion engine. As such, the rotary shaft for the electric motor/generator unit rotates in unison with the internal combustion engine main shaft at the fixed pulley ratio of the hybrid vehicle design.

A control circuit controls and varies the torque of the electric motor/generator unit between a negative value and a positive value. When the control circuit sets the torque of the electric motor/generator unit to a negative value, the main shaft from the internal combustion engine rotatably drives the electric motor/generator unit in a generator mode thereby storing electrical energy in one or more batteries contained within the vehicle. Conversely, when the control circuit sets the torque to a positive torque, the electric motor/generator unit acts as an electric motor to increase the torque on the internal combustion engine main shaft thus consuming electricity from the battery and providing driving power for the hybrid vehicle.

These previously known hybrid vehicle designs, however, have encountered several disadvantages. One disadvantage is that, since the pulley ratio between the electric motor/generator rotary shaft and the internal combustion engine main shaft is fixed, e.g. 3 to 1, the electric motor/generator is rotatably driven at high speeds during a high speed revolution of the internal combustion engine. For example, in the situation where the pulley ratio between the electric motor/generator rotary shaft and the internal combustion engine main shaft is 3 to 1, if the internal combustion engine is driven at a high revolutions per minute of, e.g. 5,000 rpm, the electric motor/generator unit is driven at a rotation three times that amount, i.e. 15,000 rpm. Such high speed revolution of the electric motor/generator thus necessitates the use of expensive components, such as the bearings and brushes, to be employed to prevent damage to the electric motor/generator during such high speed operation.

A still further disadvantage of these previously known hybrid vehicles is that the electric motor/generator unit achieves its most efficient operation, both in the sense of generating electricity and also providing additional power to the main shaft of the internal combustion engine, only within a relatively narrow range of revolutions per minute of the motor/generator unit. However, since the previously known hybrid vehicles utilized a fixed pulley ratio between the motor/generator unit and the internal combustion engine main shaft, the motor/generator unit oftentimes operates outside its optimal speed range. As such, the overall hybrid vehicle operates at less than optimal efficiency.

A still further disadvantage of these previously known hybrid vehicles is that the electric motors were able to generate appreciable torque only at low engine speeds. As such, the electric motor was able to provide additional torque to the internal combustion engine only at low engine speeds, including engine start up. This, in turn, necessitated relatively larger internal combustion engines in order to obtain acceptable performance which resulted in a decrease in fuel efficiency for the hybrid vehicle.

SUMMARY OF THE PRESENT INVENTION

The present invention provides a system for selectively consuming and storing electrical energy in a hybrid vehicle which overcomes the above-mentioned disadvantages of the previously known systems for hybrid vehicles.

In brief, the present invention includes an electric motor/generator unit having a rotary shaft. The electric motor/generator unit, in the conventional fashion, operates under the control of a control circuit that varies the torque of the electric motor/generator unit between a negative value and a positive value as a function of the operating condition of the vehicle and driver demand. When the control circuit sets a negative torque for the electric motor/generator unit, the electric motor/generator unit operates in the generator mode which generates electrical energy for storage in the batteries for the vehicle. Conversely, when the electric motor/generator unit is set to a positive torque by the control circuit, the electric motor/generator unit operates in the motor mode in which a positive torque is provided to the rotary shaft for the electric motor/generator unit.

The system further includes an internal combustion engine which also has a main shaft. This main shaft is coupled to the drive wheels for the hybrid vehicle.

Unlike the previously known hybrid vehicles, however, a continuously variable transmission is mechanically coupled between the electric motor/generator unit rotary shaft and the engine main shaft. This continuously variable transmission includes a first rotary member and a second rotary member that are coupled together by a plurality of variable ratio transmission elements. Preferably, the first rotary member is attached directly to the electric motor/generator unit rotary shaft while the second rotary member of the transmission is rotatably drivingly connected to the engine main shaft by a pulley and drive belt.

A control circuit controls the actuation of the continuously variable transmission. Consequently, the control circuit, by varying the rotation ratio between the first and second rotary members of the transmission, is able to maintain the engine and the electric motor/generator unit in its most optimal and efficient rotation range. Likewise, the control circuit, by varying the rotational ratio between the first and second rotary members, is able to limit the rotation speed of the electric motor/alternator unit so that less expensive medium speed components may be used with the electric motor/generator unit. Similarly, higher torques may be obtained from the electric motor/generator unit at low speeds, including engine start up. This, in turn, reduces the requirements of the internal combustion engine thereby resulting in an overall fuel and cost savings.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
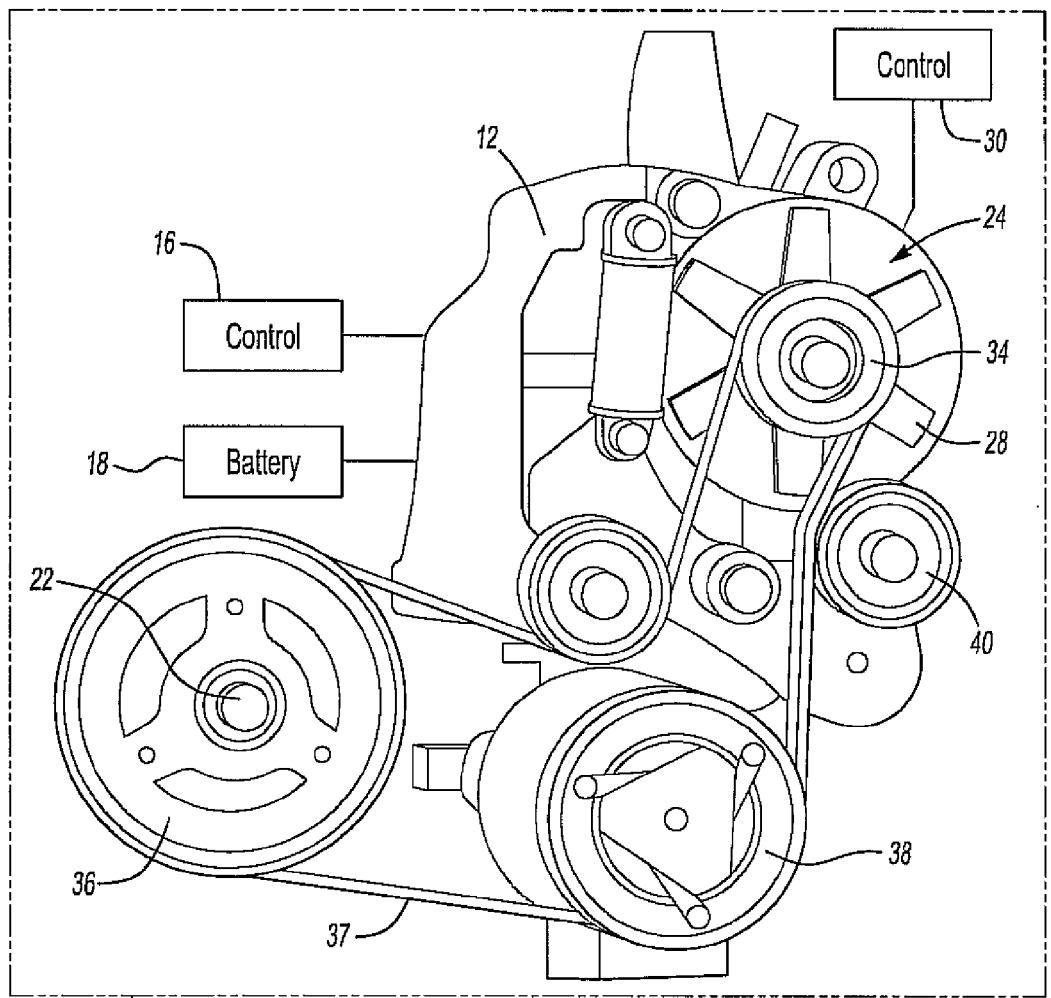
FIG. 1 is an elevational view of the preferred embodiment of the present invention with parts removed.
Figure 2:
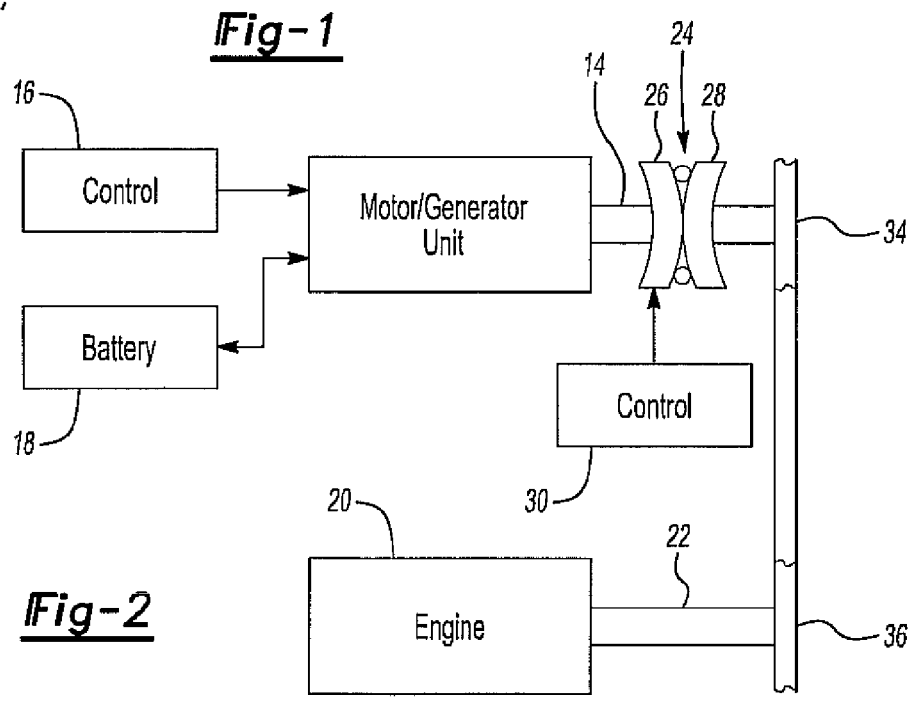
FIG. 2 is a diagrammatic view of the preferred embodiment of the invention.

With reference first to FIGS. 1 and 2, a preferred embodiment of the system 10 for selectively consuming and storing electrical energy in a hybrid vehicle 11 (illustrated only diagrammatically) is shown. The system includes an electric motor/generator unit 12 having a rotary shaft 14 (FIG. 2).

The motor/generator unit 12 operates under the control of the control circuit 16 which varies the torque of the motor/generator unit 12 between a negative and a positive value. When the control circuit 16 sets the motor/generator unit 12 to a negative value, the control circuit 16 configures the motor/generator unit as a generator. As such, rotation of the rotary shaft 14 for the motor/generator unit 12 generates electrical power which may be stored in a battery 18.

Conversely, the control circuit 16 may configure the motor/generator unit in the motor mode. When this occurs, the motor/generator unit 12 consumes electrical power from the battery 18 to produce a positive torque on the motor/generator unit rotary shaft 14. That additional torque may then be utilized to provide additional driving power for the hybrid vehicle in a fashion subsequently described.

Still referring to FIGS. 1 and 2, the hybrid vehicle includes an internal combustion engine 20 (FIG. 2) having a main shaft 22. That main shaft 22 is mechanically coupled to the wheels for the hybrid vehicle to provide the driving force for the hybrid vehicle.

Figure 3:
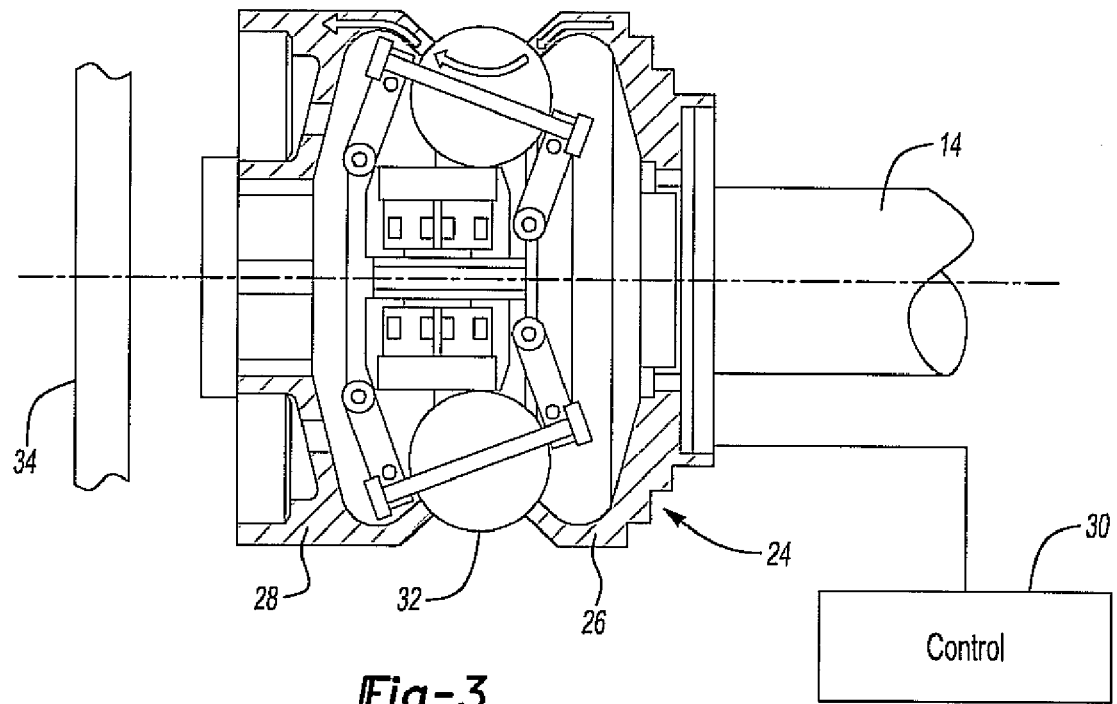
FIG. 3 is a diagrammatic sectional view of a transmission.

With reference now particularly to FIGS. 1-3 a continuously variable transmission 24 is operatively disposed between the motor/generator unit 12 and the main shaft 22 of the internal combustion engine 20. As best shown in FIG. 3, the transmission 24 includes a first rotary member 26 and a second rotary member 28. Transmission elements 32 (FIG. 3) are positioned between the first and second rotary members 26 and 28 to transmit rotational movement between the rotary elements 26 and 28.

A control circuit 30, which may be the same as the control circuit 16 (FIG. 2), controls the actuation of the transmission elements 32 to vary the rotation ratio between the rotary members 26 and 28. Preferably, the rotary ratio may be varied from a relatively small number, e.g. 0.5, to a much higher number, e.g. 1.75.

Referring now to FIGS. 2 and 3, the rotary member 26 is directly connected to the rotary shaft 14 from the motor/generator unit 12. As such, the first rotary member 26 rotates in unison with the rotary shaft 14.

As best shown in FIGS. 1-3, a pulley 34 attached to the second rotary member 28 of the transmission 24 is connected to a pulley 36 mounted to the main shaft 22 of the engine 20 by a drive belt 37. Consequently, the drive belt 37 synchronizes the rotation of the motor/generator unit rotary shaft 14 with the main shaft 22 for the engine 20. However, the ratio of rotation of the shafts 14 and 22 may be varied as desired by the control circuit 30.

With reference again to FIG. 1, the drive belt 37 may also be used to rotatably drive other vehicle components, such as an air conditioning compressor 38. Likewise, idler wheels 40 may be used to take up the appropriate slack in the drive belt 36.

Figure 4:
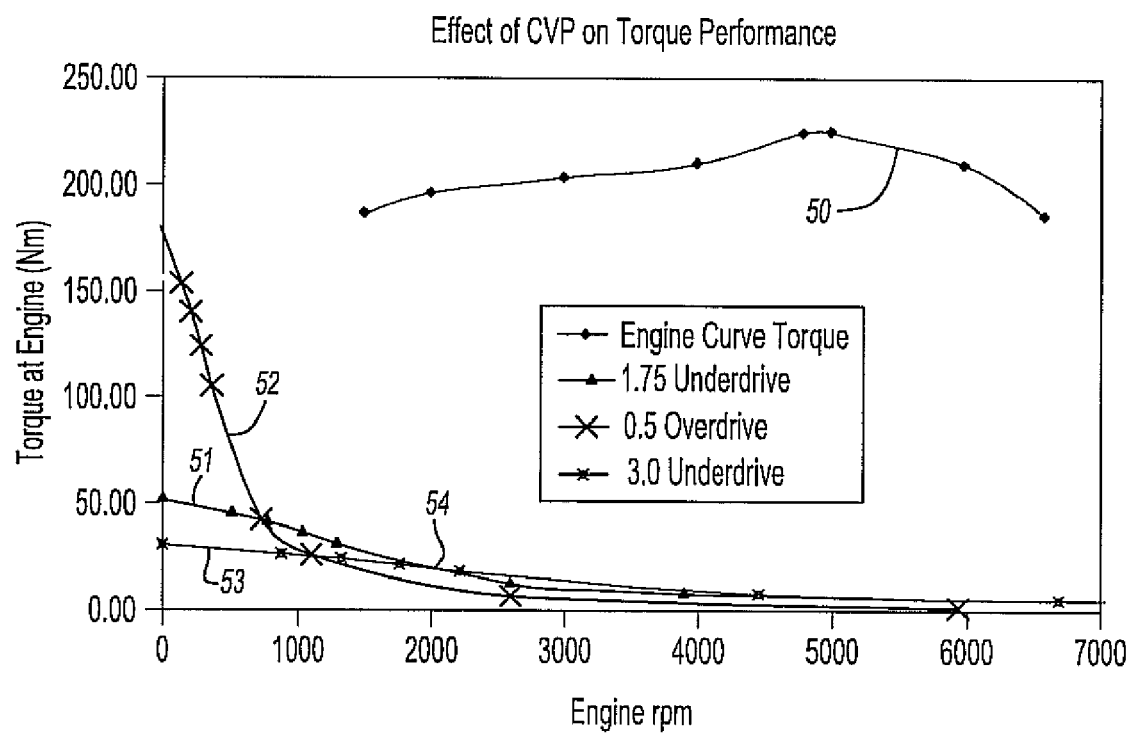
FIG. 4 is a graph illustrating the torque performance of the system of the present invention.

With reference now to FIG. 4, the effect of utilizing the continuously variable transmission is illustrated. In FIG. 4, graph 50 represents the engine torque of the internal combustion engine 20 as a function of engine speed. The torque provided by the motor/generator unit 12 is illustrated as graph 52 as seen at engine main shaft 22 for 0.5 overdrive. A torque graph 51 is also illustrated for 1.75 underdrive while graph 53 shows the torque for 3.0 underdrive. Consequently, the motor/generator unit when configured in a motor configuration is capable of generating significant torque at relatively high speeds for the internal combustion engine 20, e.g. 2000 rpm as shown at point 54. This, in turn, allows the motor/generator unit to be used for small increments of additional power as might occur, for example, when the hybrid vehicle encounters a slight uphill incline. In that case, the additional torque to drive the wheels of the hybrid vehicle is obtained from the motor/generator unit 12 rather than the internal combustion engine 20, so that the internal combustion engine 20 may be run at a constant speed for maximum fuel efficiency.

Figure 5:
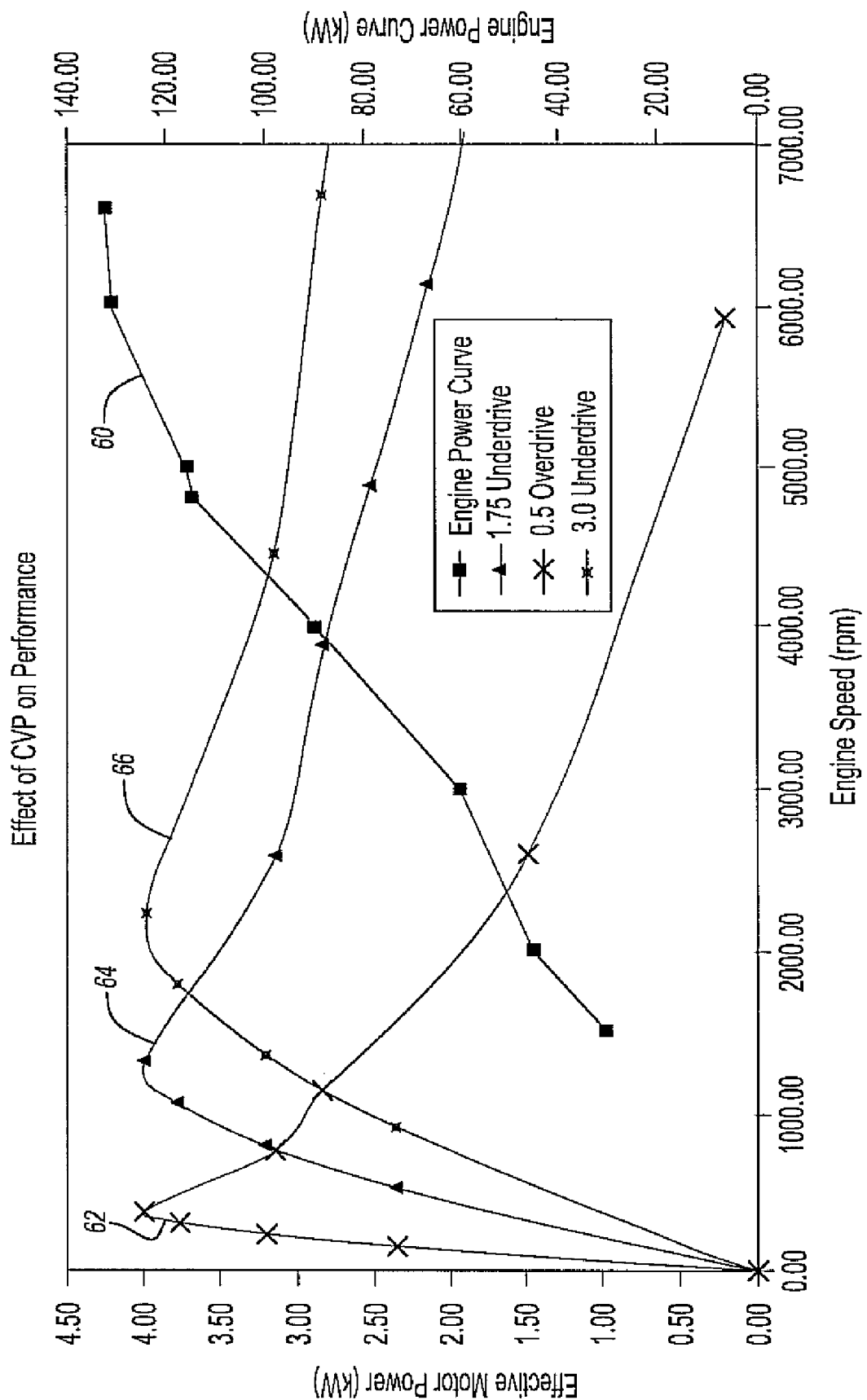
FIG. 5 is a graph illustrating the engine power performance of the system of the present invention.

With reference now to FIG. 5, an engine power curve 60 as a function of engine speed is illustrated in graph form. The engine power is illustrated by the units on the right side of FIG. 5.

Graph 62 illustrates the power (left-hand units) from the motor/generator unit 12 utilizing a fixed ratio pulley design between the motor/generator unit 12 and the internal combustion engine 20. As is clear from FIG. 5, the motor/generator unit 12 provides significant power, and thus torque, to the vehicle wheels at relatively low speeds, e.g. less than 2000 rpm.

Conversely, by utilizing the continuously variable transmission 24, the power curve for the motor/generator unit 12 may be shifted for optimum efficiency of the motor/generator unit as illustrated by graphs 64 and 66 (units on left of FIG. 5). Graph 64 illustrates that significant power, and thus torque, may be obtained from the motor/generator unit 12 at much higher engine speeds in engine speeds more likely to be encountered during the normal operation of the hybrid vehicle by increasing the rotation ratio of the transmission 24. Graph 66 illustrates the power curve of the motor/generator unit 12 using yet a higher ratio 24 for the transmission 24. In both cases, this, in turn, reduces the demands on the internal combustion engine 20 and likewise reduces the fuel consumption by the internal combustion engine 20.

Additional torque at engine start up may also be obtained by reducing the rotation ratio of the transmission 24 to a value less than one. This allows additional torque to be generated from the motor/generator unit 12 at engine start up. Furthermore, since the variable ratio transmission 24 enables the motor/generator unit 12 to contribute significant torque at higher engine speeds, a less powerful internal combustion engine may be used without loss of overall performance.

From the foregoing, it can be seen that the present invention provides a simple and yet highly effective system for selectively consuming and storing electrical energy in a hybrid vehicle. Having described my invention, however, many modifications thereto will become apparent to those skilled in the art to which it pertains without deviation from the spirit of the invention as defined by the scope of the appended claims.

I claim:

1. A system for selectively consuming and storing electrical energy in a hybrid vehicle comprising:

an electric motor/generator unit having a rotary shaft, an internal combustion engine having a main shaft, a continuously variable transmission mechanically coupled in series between said electric motor/generator unit rotary shaft and said engine main shaft, a first control circuit which varies the torque of said electric motor/generator unit rotary shaft between a negative value and a positive value as a function of the operating condition of the vehicle, a second control circuit which varies the ratio of the continuously variable transmission, wherein said transmission includes a first rotary member and a second rotary member rotatably coupled together by a variable ratio transmission element, said first rotary member being directly attached to and rotating in unison with said electric motor/generator unit rotary shaft, and a drive belt rotatably connecting said second rotary member of said transmission and said engine main shaft together.

2. The invention as defined in claim 1 wherein said second control circuit varies the ratio of said transmission element as a function of the operating condition of the vehicle.

* * * * *